Figure 1:
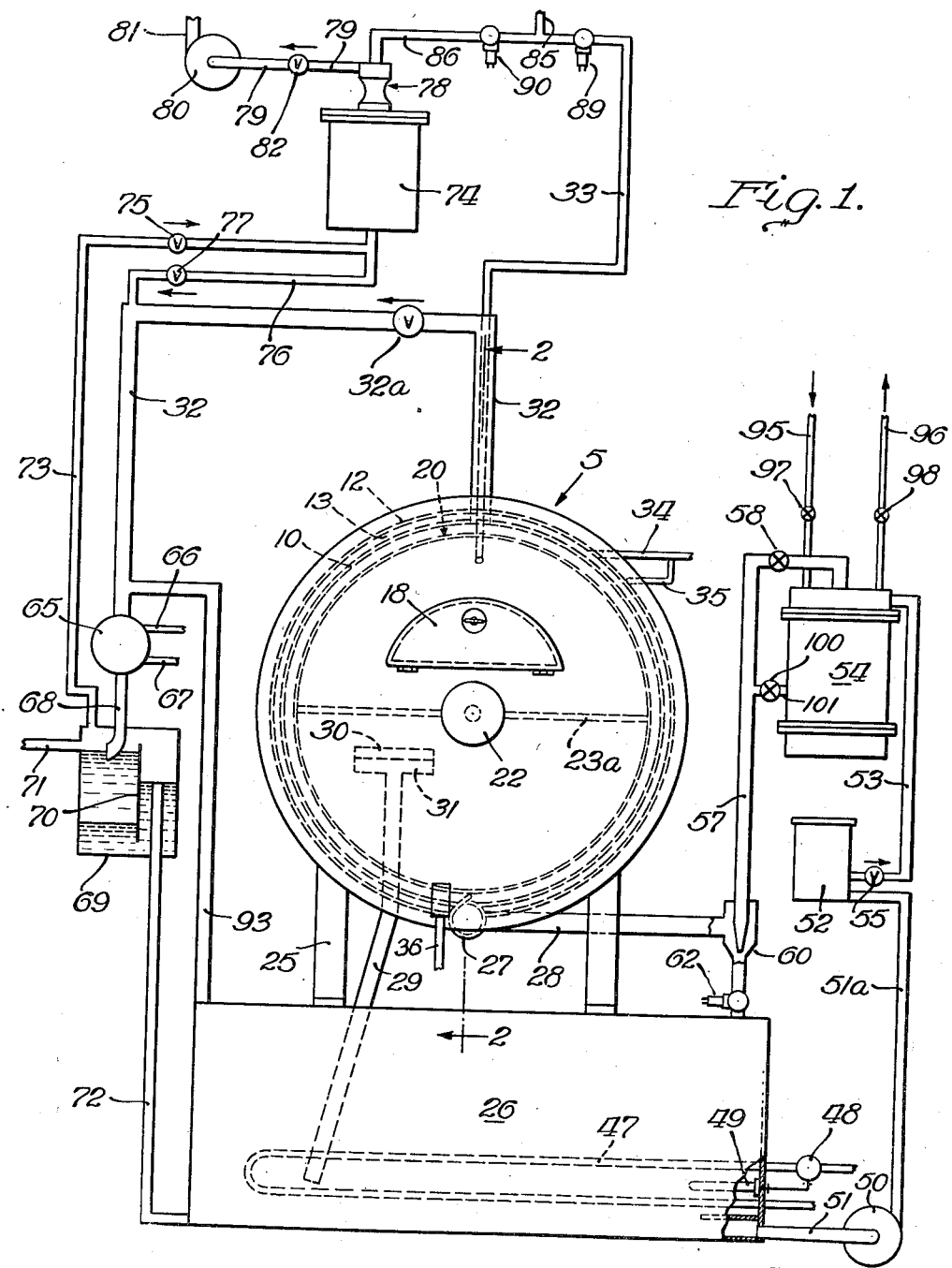

Dec. 1, 1953

D. McDONALD 2,660,869

DRY CLEANING APPARATUS

Filed Oct. 23, 1951

2 Sheets-Sheet 1

INVENTOR.
Dan McDonald
BY
Brown, Jackson, Boettcher & Dienner.
Attys.

Dec. 1, 1953 — D. McDONALD — 2,660,869
DRY CLEANING APPARATUS
Filed Oct. 23, 1951 — 2 Sheets-Sheet 2
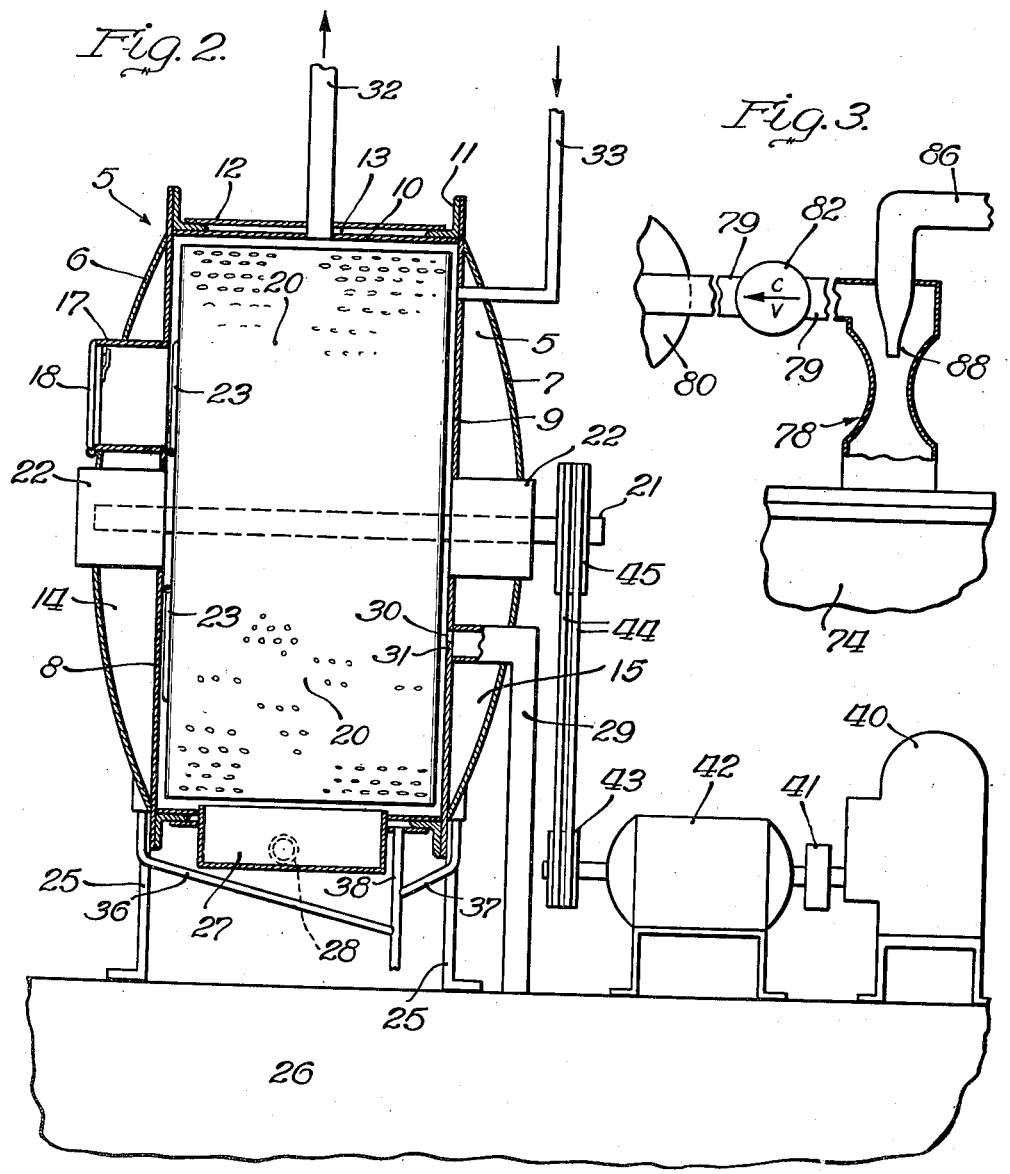
INVENTOR.
Dan McDonald Patented Dec. 1, 1953

2,660,869

UNITED STATES PATENT OFFICE 2,660,869

DRY CLEANING APPARATUS

Dan McDonald, Aurora, Ill., assignor to Aurora Research Industries, Inc., Aurora, Ill., a corporation of Illinois Application October 23, 1951, Serial No. 252,628

11 Claims. (Cl. 68—18)

This invention relates to dry cleaning apparatus for use in the dry cleaning of clothes and analogous articles in suitable solvents, preferably chlorinated hydrocarbons.

Dry cleaning apparatuses are well known and extensively used. In general, the apparatuses presently in use are rather complicated both in construction and operation, employ a multiplicity of control valves, are expensive and are not well suited for use of chlorinated hydrocarbon solvent due to the excessive wastage of the solvent employed in the cleaning operation.

My invention is directed to the provision of dry cleaning apparatus of comparatively simple construction and operation, which is comparatively inexpensive and is well suited for using chlorinated hydrocarbon solvents, preferably carbon tetrachloride or perchlorethylene. In the apparatus of my invention I provide means whereby the solvent—for example, carbon tetrachloride—is maintained at a temperature above the boiling point of its azeotrope with water and this water free solvent is continuously circulated through the filter so as to at all times maintain the latter in a clean and efficient operating condition. The continuous circulation of the hot water free solvent through the filter renders it possible to use a filter of substantially smaller size than the filters used in presently employed dry cleaning apparatus. I also provide means whereby solvent from the filter may be delivered to either the washer or to the solvent storage tank, optionally, by means of a single control valve. The means for returning the filtered solvent to the storage tank embodies an aspirator arrangement such that draining or discharge of solvent and vapors from the washer, upon and after completion of the washing operation, is accelerated thereby effecting a substantial saving in time in draining of the washer. A further important feature of my invention is a novel valve arrangement whereby but a small number of valves are required in the apparatus and regeneration of the carbon adsorber may be effected with expedition and without necessity for operating a multiplicity of valves. Further objects and advantages of my invention will appear from the detail description.

In the drawings:

Figure 1 is a semi-diagrammatic view, partly in section and partly in elevation of a dry cleaning apparatus embodying my invention;

Figure 2 is a sectional view, on an enlarged scale, taken substantially on line 2—2 of Figure 1, certain parts being shown in elevation and certain other parts being shown partly broken away and in section, the solvent storage tank being shown fragmentarily; and Figure 3 is a semi-diagrammatic view, on an enlarged scale, of the outlet conduit leading from the outlet of the carbon adsorber and of the venturi and the steam nozzle in that conduit, and associated parts.

The apparatus includes a washer 5 of cylindrical form having outwardly bulged front and back heads 6 and 7, respectively, spaced from end walls 8 and 9 between which is disposed an annular sheet metal strip constituting the circumferential wall of the body of the washer. The end walls 8 and 9 and the circumferential wall 10 are all secured, conveniently by welding, to annular frame members 11 of angle cross section. An outer circumferential wall 12 is secured to the frame members 11 in spaced relation to the wall 10, defining therewith an annular steam jacket 13. The heads 6 and 7 define with the end walls 8 and 9, respectively, end steam jackets 14 and 15, respectively. A collar 17 extends from end wall 8 through the head 6 defining an opening of suitable form and size into the interior of the machine, the outer end of such opening being closed by a door 18 mounted and secured in any suitable known manner.

A perforated cylindrical drum or basket 20 is rotatably mounted within the washer 5 by means of a shaft 21 coaxial with drum 20 and with the casing or housing of the washer. The shaft 21 is rotatably mounted in suitable bearings enclosed within housings 22 extending between the end walls 8 and 9 and the heads 6 and 7 are welded or otherwise suitably secured thereto. The drum or basket 20 is provided with an interior partition member or shelf 23a separating it into two compartments. Drum 20 is provided with two openings each normally closed by a door 23 mounted and secured in any suitable known manner, the doors 23 being positioned for alignment with the door opening defined by the collar 17 for placing articles in and removing them from the drum 20. The machine is suitably supported, conveniently by brackets 25 upon a base or other suitable support, conveniently a solvent storage tank 26. A solvent discharge or dump manifold 27, open at its top, is provided at the bottom of the machine and has connected thereto a solvent discharge and inlet pipe or conduit 28. An overflow conduit 29 opens into the body of the machine 5 an appropriate distance above the bottom thereof, through a slot like opening 30 above a baffle 31 provided by a portion of the end wall 9. The overflow pipe or conduit 29 discharges into the solvent storage tank 26 adjacent the bottom thereof below the liquid level therein, as shown more clearly in Figure 1. A conduit 32 opens into the washer at the top thereof and a steam supply pipe 33 opens into the washer through end wall 9, as in Figure 2. Conduit 32 is provided with a check valve 32a opening away from and closing toward the washer 5. Steam is supplied to the steam jackets 13, 14 and 15 through a steam pipe 34 and branches 35 thereof, condensate from the steam jackets being discharged through pipes 36, 37 and 38. The drum or basket 20 may be rotated at low speed by means of a motor and gear reduction unit 40 having driving connection through a slip clutch 41 to the shaft of a motor 42 having, at the other end of its shaft, a multiple V pulley 43 having driving connection through belts 44 to a multiple V pulley 45 secured on shaft 21. The basket or drum 20 may be driven at low speed by unit 40, through slip clutch 41 and motor 42, or at high speed by the motor 42, as will appear more fully later.

The solvent within the storage tank 26 is maintained at a temperature above the boiling point of its azeotrope with water. If carbon tetrachloride is used as the solvent, it it maintained at a temperature of from approximately 155° F., to 160° F. As is well known, carbon tetrachloride has a boiling point of about 170° F. and its azeotrope with water boils at about 152° F., both at atmospheric pressure. A heating coil 47 is disposed within tank 26, adjacent the lower portion thereof, and receives steam from a suitable source of supply, admission of steam to the coil 47 being controlled by a thermostat valve 48 actuated by pressure of a thermo-sensitive fluid in a bulb 49 disposed within the tank 26. Thermostat valves of the character referred to are well known and no further description of the valve 48 is deemed necessary. Any suitable means may be provided for controlling the admission of steam to the coil 47 and thereby maintaining the solvent within tank 26 at the desired temperature. Within the broader concept of my invention, any suitable means may be provided for maintaining the solvent within tank 26 at the temperature desired.

A continuously operating pump 50 has its intake connected, by a pipe or conduit 51, to tank 26 adjacent the bottom thereof. The discharge of pump 50 is connected by a conduit 51a to a filter powder box or container 52 the outlet of which is connected by a conduit 53 to the inlet of a filter 54 of suitable known type. A check valve 55 is provided in conduit 53 and opens toward the filter 54, closing toward the container 52 and guarding against back flow of solvent from filter 54. The outlet of filter 54 is connected by a conduit 57, controlled by a valve 58, which may be a manually operated valve of suitable known type, to the storage tank 26 at the top thereof. The conduit 57 is provided with a Venturi type aspirator 60 therein a short distance above tank 26 and the conduit 28 opens into conduit 57 at the suction of the venturi 60. The conduit 57 is provided, between storage tank 26 and aspirator 60 with a control valve 62, preferably a solenoid valve of known type. This solenoid valve 62, in conjunction with the arrangement of certain other valves, gives simple control of the apparatus for washing and deodorizing the articles under treatment, as will appear more fully later.

The conduit 32 is connected, at its other end, to the inlet of a condenser 65 of known type, through which cooling water is circulated through pipes 66 and 67. The outlet of condenser 65 is connected, through a conduit 68, to a gravity water and solvent separator 69 of known type. The separator 69 is provided with an interior baffle 70 spaced from the top and the bottom thereof and with a water discharge pipe 71 which, in practice, is provided with a U trap, the water being continuously discharged from the separator through pipe 71. Baffle 70 extends above the water level in the separator 69 and downwardly to within a short distance of the bottom of the separator, as shown. A pipe or conduit 72 connects the separator 69 to tank 26, adjacent the bottom thereof, for continuously delivering thereto from separator 69 the solvent separated by gravity from water within the separator 69. The conduit 68 leading from the outlet of condenser 65 opens above the water level in separator 69, for escape from the condensate of entrained vapors and gases.

A conduit 73 connects the top of separator 69 to the inlet of a suitable carbon adsorber 74 which may be of known type. This conduit 73 is provided with a check valve 75 opening toward the adsorber 74 and closing toward the separator 69. A conduit 76 connects conduit 32 to conduit 73 adjacent the adsorber 74, and is provided with a check valve 77 opening toward the condenser 65 and closing toward the adsorber 74. The outlet of adsorber 74 is connected to the outlet of an aspirator 78, for a purpose to be described presently. A discharge conduit 79 is connected at one end to the suction of aspirator 78 and at its other end to the intake of a continuously operating blower 80 having a discharge outlet 81 to atmosphere. The conduit 79 is provided with a check valve 82 opening toward blower 80 and closing toward aspirator 78. The steam pipe 33 is connected to a steam supply pipe 85 from which a second pipe 86 extends to the aspirator 78. This pipe 86 is provided with a steam nozzle 88 disposed to direct a jet of steam through the aspirator 78 toward the carbon adsorber 74. The steam pipes 33 and 86 are controlled by normally closed solenoid valves 89 and 90, respectively.

After the clothes and analogous articles have been placed in the basket or drum 20 and the doors have been closed, valve 62 is closed so that the hot solvent then is delivered from the filter 54 to the washer, in which the solvent is maintained at the desired level by the overflow conduit 29 and opening 30. The basket or drum 20 is rotated at low speed, about twenty-six R. P. M., by the unit 40, and during the washing operation the azeotropic vapor is drawn off through the conduit 32 to condenser 65, from which the condensate is delivered to the separator 69. The condenser 65, by condensing the vapors flowing thereto, maintains a partial vacuum which facilitates drawing off the vapors from the washer and, in addition, the system is maintained at subatmospheric pressure by means of the continuously operating blower 80 which has connection, through adsorber 74 and conduit 73 to the condensate discharge conduit 68 of condenser 65 and thence to the washer through conduit 32. The steam jacketed washer is maintained at proper temperature to assure that the solvent therein is above the boiling point of the azeotrope so that substantially all of the air is removed from the washer and risk of oxidation of stains or spots on the articles under treatment is avoided, thus eliminating necessity for spotting of the articles before cleaning. Upon completion of the washing step, which requires but a comparatively short time, due to use of the hot chlorinated hydrocarbon solvent, the valve 62 is opened for draining solvent from the washer. As previously noted, the pump 50 operates continuously, so that, when the valve 62 is opened, solvent from the filter 54 flows through the aspirator 60. The solvent flowing through aspirator 60 induces rapid flow of solvent through conduit 28 thereby accelerating discharge or drainage of solvent from the washer. When the free solvent has been drained from the washer, the basket or drum 20 is then rotated at high speed, approximately four hundred R. P. M., so as to centrifugally extract from the clothes or like articles the major portion of the solvent remaining therein. The solvent content of the clothes or analogous articles is thus reduced from approximately three hundred percent of the weight of the clothes or other articles in their normal dry condition. The solvent centrifugally extracted from the articles flows through the conduit 28 to the storage tank 26, such flow being accelerated by the solvent flowing from the filter 54 through the aspirator 60 as above explained. Upon completion of the centrifuging operation, the motor 42 is stopped, the drum or basket continuing to rotate for a short time due to inertia. During this continued rotation of the drum or basket 20, the solenoid valve 90 is opened, admitting steam to the nozzle 88. The steam jet flowing through Venturi shaped aspirator 78 (Fig. 3) produces subatmospheric pressure in the conduit 79, sufficient to assure that the check valve 82 remains closed. The steam flows through the adsorber 74 and thence through conduit 76, check valve 77 and conduit 32 to the condenser 65. The steam and the entrained solvent vapor are condensed in the condenser 65, the condensate therefrom being delivered to the separator 69. In that manner, any solvent which may be trapped in the adsorber 74 is recovered therefrom and returned to the storage tank 26, thereby avoiding loss of solvent, an important consideration in this art. Further, discharge of solvent to the atmosphere is eliminated so that the air discharged from the blower 80 is free of solvent and contains no objectionable substances and is substantially odorless. This operation of regenerating the carbon adsorber requires but a short time and may be completed by the time the drum or basket 20 has slowed down to about its speed of twenty-six R. P. M., employed for the washing operation.

When regeneration of the carbon adsorber has been completed and valve 90 closed, the solenoid valve 89 is opened admitting dry steam, through conduit 33, to the washer, and the basket or drum 20 is again rotated at approximately twenty-six R. P. M. The steam entering the washer quickly removes from the garments therein the remaining solvent, completely deodorizing the garments and also restoring thereto water content or moisture removed therefrom by the hot solvent during the washing operation. The amount of moisture restored to the clothes or analogous articles during the steaming and deodorizing operation preferably is somewhat less than the normal moisture content thereof, so that there is no risk of having the cleaned and deodorized articles objectionably wet.

During the steaming and deodorizing operation, the solenoid valve 62 remains open and the solvent flowing from filter 54 through the aspirator 60 produces a suction effect in the conduit 28, which assists in taking off the evolved heavy azeotropic vapors from the bottom of the washer. A conduit 93 connects the top of the storage tank 26, to the conduit 32 at the inlet side of the condenser 65. Any vapors evolved within the storage tank 26 are withdrawn through the conduit 93 and pass to the condenser 65, from which the condensate is delivered to the separator 69, as previously described. The conduit 93 is thus connected through tank 26, conduit 57 and conduit 28, to the bottom of the washer 5 and supplements the action of aspirator 60 in withdrawing solvent vapor from washer 5 during deodorizing, while also removing from tank 26 to the condenser any vapors evolved therein or entering the tank 26.

The solvent in tank 26 and in the washer 5 is maintained at a temperature above the boiling point of its azeotrope with water. The azeotropic vapor evolved in washer 5 is continuously removed therefrom as above described and any azeotropic vapor which may be evolved in tank 26 is continuously removed therefrom through conduit 93. In that manner any water present in the solvent is continuously removed therefrom in the evolved azeotropic vapor and the solvent in tank 26 is maintained water free. Within the broader aspects of my invention, any suitable means may be provided for maintaining the solvent in tank 26 water free. From what has been said, it will be seen that the hot solvent circulated from tank 26 through the filter 54 during all steps of the cleaning operation is water free, so that there is no risk of the filter becoming water clogged and the filter is maintained in a clean and highly efficient operating condition.

It is desirable that means be provided for steaming the filter for removing therefrom the solvent, when it is desired to open the filter for inspection, replacement, repairs, or for any other reason. To that end, I provide steam inlet and outlet pipes 95 and 96, respectively, connected to the filter 54, pipe 95 extending to the bottom of filter 54 and being controlled by a manually operated valve 97, and pipe 96 leading from the top of filter 54 and being controlled by a manually operated valve 98. Preliminary to opening the filter, the pump 50 is stopped, after which a control valve 100, in a drain nipple 101 connecting filter 54 to conduit 57 is opened, so as to drain the major portion of the solvent therefrom. Thereafter, valves 58 and 100 are closed, and valves 97 and 98 are opened, for circulating steam through the filter, it being noted that check valve 55 prevents entry of steam into the filter powder box or container 52. After the filter 54 has been steamed sufficiently to remove the remaining solvent therefrom, the valves 97 and 98 are closed and the filter may then be opened for inspection or such repair or replacement as may be desirable. Thereafter, the parts are restored to their normal condition and operation of the system may be resumed. From what has been said, it will be seen that operation of the system is controlled, to considerable extent, by the solenoid valve 62, and that by the arrangement of the check valves 75 and 77 and associated parts the carbon adsorber 74 may quickly be regenerated without interfering with operation of the system, the aspirator 78 and steam nozzle 88 cooperating to assure closing of the check valve 82 during the operation of regenerating the carbon adsorber. Also, as above noted, by continuously circulating the hot solvent through the filter, the latter is maintained in the most efficient operating condition and a comparatively small filter may be utilized.

While I have described the apparatus of my invention as used in connection with chlorinated hydrocarbon solvents, by way of example, it may be used in connection with any suitable solvents.

It will be understood that changes in detail may be resorted to without departing from the field and scope of my invention, and I intend to include all such variations, as fall within the scope of the appended claims, in this application in which the preferred form only of my invention has been disclosed.

I claim:

1. In dry cleaning apparatus, a storage tank for a chlorinated hydrocarbon of a character to form an azeotrope with water, means for maintaining the chlorinated hydrocarbon in said tank free of water, a treating vessel, a filter, and selective means for continuously circulating water-free solvent from said tank through said filter to either said tank or said vessel.

2. In hot dry cleaning apparatus, a chlorinated solvent storage tank, temperature regulated means for maintaining said solvent in said tank at a temperature range between the solvent-water azeotrope boiling point and the solvent boiling point, a washer and means providing an overflow connection therefrom to said tank, a filter, a continuously operating pump having its intake connected to the bottom of said tank and its discharge connected to the inlet of said filter for continuously delivering to the latter solvent from said tank, a conduit connecting the outlet of said filter to said tank, a solvent drain and supply conduit connecting said first conduit to said washer adjacent the bottom thereof, a valve in said first conduit between said tank and the juncture of said conduits operable for selectively directing solvent from said filter to either said tank or said washer, and means for collecting azeotrope vapor from the top of the washer and the tank and condensing the same and returning condensed solvent to said tank.

3. In a dry cleaning apparatus, a steam jacketed washer and means for supplying steam to the jacket thereof, a storage tank for heated chlorinated solvent, temperature regulated means for maintaining said solvent in said tank at a temperature range between the solvent boiling point and the solvent-water azeotrope boiling point, a filter, means for supplying filter powder to the filter, a pump and means connecting the pump with said tank below the liquid level therein and with the filter for delivering said heated solvent to the filter, means including pipe connections from the filter to said tank and washer for delivering filtered solvent selectively to the tank and to the washer and for draining solvent from the washer to the tank, a solvent overflow pipe communicating with the washer above the bottom thereof at a predetermined liquid level therein and with the tank below the liquid level therein, means for delivering dry steam to the interior of the washer, a condenser, means including conduits establishing constant flow communication to the condenser from the upper portions of the tank and washer during evolution of azeotrope vapors in said tank and washer, gravity operated liquid separating means connected with the condenser to receive water and solvent condensates therefrom and connected with the lower portion of the tank to deliver separated solvent to the latter, a carbon adsorber and means connecting it to the upper portion of said separator, and suction means connected with the adsorber for evacuating non-condensable gases therefrom to atmosphere.

4. In a dry cleaning apparatus, a steam jacketed washer and means for supplying steam to the jacket thereof, a storage tank for heated chlorinated solvent, temperature regulated means for maintaining said solvent in said tank at a temperature range between the solvent boiling point and the solvent-water azeotrope boiling point, a filter, means for supplying filter powder to the filter, a pump and means connecting the pump with said tank below the liquid level therein and with the filter for delivering said heated solvent to the filter, a conduit connecting the outlet of said filter to said tank including an aspirator positioned in said conduit, a second conduit connected to the washer adjacent the bottom thereof and connected with said aspirator to deliver fluid thereto from the washer subject to the suction effect of solvent being pumped from the filter through said aspirator to said tank, a valve in said first conduit between the aspirator and said tank operable when closed to direct solvent from the filter into said washer and when open to enable solvent flowing from the filter to said tank to impose suction through said second conduit on said washer, an overflow pipe communicating with the washer at a predetermined liquid level therein above the bottom of the washer and with the tank below the liquid level therein, means for delivering dry steam to the interior of the washer, a condenser, pipes connected to the condenser and to the upper portions of said washer and of said tank for delivering azeotrope vapors to the condenser, gravity operated liquid separating means connected with the condenser to receive water and solvent condensates therefrom and connected with the lower portion of the tank to deliver separated solvent to the latter, a carbon adsorber and means connecting it to the upper portion of said separator, and suction means connected with the adsorber for evacuating non-condensable gases therefrom to atmosphere.

5. In a dry cleaning apparatus, a steam jacketed washer and means for supplying steam to the jacket thereof, a storage tank for heated chlorinated solvent, temperature regulated means for maintaining said solvent in said tank at a temperature range between the solvent boiling point and the solvent-water azeotrope boiling point, a filter, means for supplying filter powder to the filter, a pump and means connecting the pump with said tank below the liquid level therein and with the filter for delivering said heated solvent to the filter, means including pipe connections from the filter to said tank and washer for delivering filtered solvent selectively to the tank and to the washer and for draining solvent from the washer to the tank, a solvent overflow pipe communicating with the washer at a predetermined liquid level therein above the bottom of the washer and with the tank below the liquid level therein, means for delivering dry steam to the interior of the washer, a condenser, pipes connected to the condenser and to the upper portions of said washer and of said tank for delivering azeotrope vapors to the condenser, gravity operated liquid separating means connected with the condenser to receive water and solvent condensates therefrom and connected with the lower portion of the tank to deliver separated solvent to the latter, a carbon adsorber and means connecting it to the upper portion of said separator, suction means connected with the adsorber for evacuating non-condensable gases therefrom to atmosphere, and means connectible to a steam source for stripping adsorbed solvent from the adsorber and delivering it to said condenser.

6. In a dry cleaning apparatus, a steam jacketed washer and means for supplying steam to the jacket thereof, a storage tank for heated chlorinated solvent, temperature regulated means for maintaining the solvent in said tank at a temperature range between the solvent boiling point and the solvent-water azeotrope boiling point, a filter, means for supplying filter powder to the filter, a pump and means connecting the pump with said tank below the liquid level therein and with the filter for delivering said heated solvent to the filter, a conduit connecting the outlet of said filter to said tank including an aspirator positioned in said conduit, a second conduit connected to the washer adjacent the bottom thereof and connected with said aspirator to deliver fluid thereto from the washer subject to the suction effect of solvent being pumped from the filter through said aspirator to said tank, a valve in said first conduit between the aspirator and said tank operable when closed to direct solvent from the filter into said washer and when open to enable solvent flowing from the filter to said tank to impose suction through said second conduit on said washer, an overflow pipe communicating with the washer at a predetermined liquid level therein above the bottom of the washer and with the tank below the liquid level therein, means for delivering dry steam to the interior of the washer, a condenser, pipes connected to the condenser and to the upper portions of said washer and of said tank for delivering azeotrope vapors to the condenser, gravity operated liquid separating means connected with the condenser to receive water and solvent condensates therefrom and connected with the lower portion of the tank to deliver separated solvent to the latter, a carbon adsorber and means connecting it to the upper portion of said separator, suction means connected with the adsorber for evacuating non-condensable gases therefrom to atmosphere, and means connectible to a steam source for stripping adsorbed solvent from the adsorber and delivering it to said condenser.

7. In a dry cleaning apparatus, a steam jacketed washer and means for supplying steam to the jacket thereof, a storage tank for heated chlorinated solvent, temperature regulated means for maintaining said solvent in said tank at a temperature range between the solvent boiling point and the solvent-water azeotrope boiling point, a filter, means for supplying filter powder to the filter, a pump and means connecting the pump with said tank below the liquid level therein and with the filter for delivering said heated solvent to the filter, means for delivering solvent from the filter to said tank, means for delivering filtered solvent to said washer, means for draining solvent from the bottom of the washer to said tank, a solvent overflow pipe communicating with the washer above the bottom thereof at a predetermined liquid level therein and with the tank below the liquid level therein, means for delivering dry steam to the interior of the washer, a condenser, means including conduits establishing constant flow communication to the condenser from the upper portions of the tank and washer during evolution of azeotrope vapors in said tank and washer, gravity operated liquid separating means connected with the condenser to receive water and solvent condensates therefrom and connected with the lower portion of the tank to deliver separated solvent to the latter, a carbon adsorber and means connecting it to the upper portion of said separator, and suction means connected with the adsorber for evacuating noncondensable gases therefrom to atmosphere.

8. In a dry cleaning apparatus, a steam jacketed washer and means for supplying steam to the jacket thereof, a storage tank for heated chlorinated solvent, temperature regulated means for maintaining said solvent in said tank at a temperature range between the solvent boiling point and the solvent-water azeotrope boiling point, a filter, a pump and means connecting the pump with said tank below the liquid level therein and with the filter for delivering said heated solvent to the filter, means including pipe connections from the filter to said tank and washer for delivering filtered solvent selectively to the tank and to the washer and for draining solvent from the washer to the tank, a solvent overflow pipe communicating with the washer above the bottom thereof at a predetermined liquid level therein and with the tank below the liquid level therein, means for delivering dry steam to the interior of the washer, a condenser, means including conduits establishing constant flow communication to the condenser from the upper portions of the tank and washer during evolution of azeotrope vapors in said tank and washer, gravity operated liquid separating means connected with the condenser to receive water and solvent condensates therefrom and connected with the lower portion of the tank to deliver separated solvent to the latter, a carbon adsorber and means connecting it to the upper portion of said separator, and suction means connected with the adsorber for evacuating non-condensable gases therefrom to atmosphere.

9. In a dry cleaning apparatus, a steam jacketed washer and means for supplying steam to the jacket thereof, a storage tank for heated chlorinated solvent, temperature regulated means for maintaining said solvent in said tank at a temperature range between the solvent boiling point and the solvent-water azeotrope boiling point, a filter, a pump and means connecting the pump with said tank below the liquid level therein and with the filter for delivering said heated solvent to the filter, a conduit connecting the outlet of said filter to said tank including an aspirator positioned in said conduit, a second conduit connected to the washer adjacent the bottom thereof and connected with said aspirator to deliver fluid thereto from the washer subject to the suction effect of solvent being pumped from the filter through said aspirator to said tank, a valve in said first conduit between the aspirator and said tank operable when closed to direct solvent from the filter into said washer and when open to enable solvent flowing from the filter to said tank to impose suction through said second conduit on said washer, an overflow pipe communicating with the washer at a predetermined liquid level therein above the bottom of the washer and with the tank below the liquid level therein, means for delivering dry steam to the interior of the washer, a condenser, means including conduits establishing constant flow communication to the condenser from the upper portions of the tank and washer during evolution of azeotrope vapors in said tank and washer, gravity operated liquid separating means connected with the condenser to receive water and solvent condensates therefrom and connected with the lower portion of the tank to deliver separated solvent to the latter, a carbon adsorber and means connecting it to the upper portion of said separator, and suction means connected with the adsorber for evacuating non-condensable gases therefrom to atmosphere.

10. In a dry cleaning apparatus, a steam jacketed casing having a perforated rotary drum therein, means for supplying steam to the jacket of the drum, a storage tank for a chlorinated hydrocarbon solvent below said casing, temperature regulated means for maintaining the solvent in said tank at a temperature range between the water-solvent azeotrope boiling point and the solvent boiling point, a filter, a pump and means connecting the intake of the pump to the tank below the liquid level therein and the outlet of the pump to said filter, means selectively and electrically controllable when the pump is continuously running for pumping filtered solvent to said tank or to said casing or for draining used solvent from the bottom of the casing to said tank, solvent overflow means connected with the casing above the bottom thereof for delivering solvent to the tank when the pump is feeding solvent to the casing and having a liquid seal therein for blocking reverse vapor flow into the casing, means electrically controllable for supplying dry steam to the interior of the casing, a condenser, a vapor flow conduit connecting the upper portion of the casing with the condenser and having means preventing reverse vapor flow therein toward the casing, a vapor flow conduit connecting the upper portion of the tank with said condenser, gravity operated liquid separating means connected with the condenser to receive water and solvent condensates therefrom and connected with the lower portion of the tank to deliver separated solvent to the latter, a carbon adsorber and means connecting it to the upper portion of said separator, suction means connected with the adsorber for evacuating non-condensable gases therefrom to atmosphere, and electrically controlled means connectible to a steam source for stripping absorbed solvent from the adsorber and delivering it to said condenser.

11. In hot dry cleaning apparatus, a chlorinated solvent storage tank, temperature regulated means for maintaining said solvent in said tank at a temperature range between the solvent-water azeotrope boiling point and the solvent boiling point, a washer and means providing an overflow connection therefrom to said tank, a filter, a continuously operating pump having its intake connected to the bottom of said tank and its discharge connected to the inlet of said filter for continuously delivering to the latter solvent from said tank, a conduit connecting the outlet of said filter to said tank, a solvent drain and supply conduit connecting said first conduit to said washer adjacent the bottom thereof, a valve in said first conduit between said tank and the juncture of said conduits operable for selectively directing solvent from said filter to either said tank or said washer, and means for collecting azeotrope vapor from the top of the tank and condensing the same and returning condensed solvent to said tank.

DAN McDONALD.

References Cited in the file of this patent
UNITED STATES PATENTS

| Number | Name | Date |
|---|---|---|
| 394,672 | Benjamin | Dec. 18, 1888 |
| 630,293 | Maertens | Aug. 1, 1899 |
| 774,025 | Barbe | Nov. 1, 1904 |
| 973,388 | Sargent | Oct. 18, 1910 |
| 1,271,599 | Messer | July 9, 1918 |
| 1,615,897 | Aydelotte | Feb. 1, 1927 |
| 1,775,699 | Silver | Sept. 16, 1930 |
| 1,776,190 | Mishaw | Sept. 16, 1930 |
| 1,795,006 | Boiney | Mar. 3, 1931 |
| 1,843,657 | Welles et al. | Feb. 2, 1932 |
| 1,852,179 | McDonald | Apr. 5, 1932 |
| 2,011,083 | Sando | Aug. 13, 1935 |
| 2,064,084 | Sando | Dec. 15, 1936 |
| 2,198,412 | McDonald | Apr. 23, 1940 |
| 2,310,569 | Booth | Feb. 9, 1943 |
| 2,359,138 | Martin | Sept. 26, 1944 |
| 2,574,251 | Dinley | Nov. 6, 1951 |